US010940639B1

(12) United States Patent
Okpowe et al.

(10) Patent No.: US 10,940,639 B1
(45) Date of Patent: Mar. 9, 2021

(54) GLASS SCINTILLATORS AND METHODS OF MANUFACTURING THE SAME

(71) Applicants: Omena Okpowe, Miami, FL (US); Nezih Pala, Miami, FL (US); Chunlei Wang, Miami, FL (US)

(72) Inventors: Omena Okpowe, Miami, FL (US); Nezih Pala, Miami, FL (US); Chunlei Wang, Miami, FL (US)

(73) Assignee: The Florida International University Board of Trustees, Miami, FL (US)

( * ) Notice: Subject to any disclaimer, the term of this patent is extended or adjusted under 35 U.S.C. 154(b) by 0 days.

(21) Appl. No.: 16/775,567

(22) Filed: Jan. 29, 2020

(51) Int. Cl.
| | |
|---|---|
| *B29C 64/124* | (2017.01) |
| *B29C 64/129* | (2017.01) |
| *B29C 64/135* | (2017.01) |
| *B29C 64/165* | (2017.01) |
| *B29C 64/314* | (2017.01) |
| *B29C 64/35* | (2017.01) |
| *B29C 64/188* | (2017.01) |
| *B33Y 40/20* | (2020.01) |
| *B33Y 10/00* | (2015.01) |
| *B33Y 80/00* | (2015.01) |
| *B33Y 40/10* | (2020.01) |

(52) U.S. Cl.
CPC .......... *B29C 64/165* (2017.08); *B29C 64/188* (2017.08); *B29C 64/314* (2017.08); *B29C 64/35* (2017.08); *B33Y 10/00* (2014.12); *B33Y 40/10* (2020.01); *B33Y 40/20* (2020.01); *B33Y 80/00* (2014.12)

(58) Field of Classification Search
CPC .... B29C 64/124; B29C 64/129; B29C 64/135
See application file for complete search history.

(56) References Cited

U.S. PATENT DOCUMENTS

| | | | | |
|---|---|---|---|---|
| 5,997,795 | A * | 12/1999 | Danforth | ............ B29C 33/3842 264/401 |
| 9,650,569 | B1 * | 5/2017 | Cohen | ................ C09K 11/7731 |
| 2005/0266227 | A1 * | 12/2005 | Ku | ........................ C04B 41/009 428/304.4 |
| 2013/0105734 | A1 * | 5/2013 | Zhou | .................. C09K 11/7774 252/301.4 F |
| 2017/0090042 | A1 * | 3/2017 | Shedlock | .............. B29C 39/026 |
| 2017/0139058 | A1 * | 5/2017 | Wimmers | ............... G01T 1/202 |

(Continued)

OTHER PUBLICATIONS

Kotz (Kotz, F., Arnold, K., Bauer, W., Schild, D., Keller, N., Sachsenheimer, K., Nargang, T., Richter, C., Helmer, D., Rapp, B., "Three-dimensional printing of transparent fused silica glass", Nature, V 544, (2017), pp. 337-342).*

(Continued)

*Primary Examiner* — Jason L Lazorcik
(74) *Attorney, Agent, or Firm* — Saliwanchik, Lloyd & Eisenschenk

(57) ABSTRACT

Doped glass scintillators and methods of fabricating the same are provided. Doped glass scintillators can be fabricated by a stereolithography process, and doping can be carried out before the green body composite formation so that homogeneity of the dopant is improved. The structures retain an amorphous structure through the fabrication process, and the vacuum sintering process assists with keeping the dopants in their luminescence-producing oxidation state.

12 Claims, 6 Drawing Sheets

(56) References Cited

U.S. PATENT DOCUMENTS

| | | | |
|---|---|---|---|
| 2018/0036945 A1* | 2/2018 | Lereboullet | B33Y 70/00 |
| 2020/0024465 A1* | 1/2020 | Dylla-Spears | C03B 19/01 |
| 2020/0039868 A1* | 2/2020 | Rapp | C03B 19/066 |

OTHER PUBLICATIONS

Dosovitskiy (Dosovitskiy, G. A., Karpyuk, P.V., Evdokimov, P.V., Kuznetsova, D.E., Mechinsky, V.A., Borisevich, A.E., Fedorov, A.A., Putlayev, V.I., Dosovitskiy, A.E., Korjik, M.V., "First 3D-printed complex inorganic polycrystalline scintillator", CrystEngComm. 2017, 19, 4260-4264).*

Chiodini (Chiodini, N., Fasoli, M., Martini, M., Morazzoni, F. Rosetta, E. Scotti, R. Spinoli, G. Vedda, A., Nikl, M., Solovieva, N., Baraldi, A., Capelletti, R., and Francini, R., "Rare-earth doped sol-gel silicate glasses for scintillator applications", Radiation Effects & Defects in Solids, 2003, v158, pp. 463-46.*

Mishnayot, Y., Layani, M., Cooperstein, I., Magdassi, S., Ron, G., "3D printing of scintillating materials", (2014), https://arxiv.org/pdf/1406.4817.pdf.*

Korzhik, M., Gektin, A., Engineering of scintillation materials and Radiation, Springer PRoceedings in Physics, vol. 227, (2018) ISSN 0930-8989.*

Kielty, Matthew William, "Cerium Doped Glasses: Search for a New Scintillator" (2016). All Theses. 2545. https://tigerprints.clemson.edu/all_theses/2545.*

Herrmann, A., Russel, C., Pachler, P., "Ce3+ doped ytrrium aluminum and lutetium aluminum garnet embedded in a soda-lime silica glass by a sintering technique", Optical Materials Express, V5, N.10, (2015), 2193-2200.*

Kotz et al., Three-dimensional printing of transparent fused silica glass, Nature 2017, vol. 544, 337.

* cited by examiner

GLASS SCINTILLATORS AND METHODS OF MANUFACTURING THE SAME

BACKGROUND

A scintillator is a material that exhibits luminescence when excited by ionizing radiation. Among various scintillator types, including organic and inorganic, doped glass ceramics have gained significant interest as a result of their ease of processing and good mechanical, chemical, and thermal properties, as well as their good absorbance properties at wavelengths below the visible region. Such absorbance properties are rarely exhibited in other types of commercial state of art scintillators. Apart from these properties, recent advances in glass three-dimensional (3D) printing especially the application of stereolithography in fabricating high quality 3D glass ensembles implies that scintillators of different forms and shapes can now be fabricated with even microscopic features non-existent in other processed glass materials.

Transparent glass ceramic scintillators are doped glass ceramics typically fabricated from ceramic powders via melt quenching or high temperature sintering. The final ensembles typically include base ceramic matrices doped with a scintillating activator. The need to retain the dopants in their less stable luminescence-producing oxidation state is a challenge and leads to a more complex fabrication process as additional reducing agents or reducing environments need to be introduced or applied during the process.

BRIEF SUMMARY

Embodiments of the subject invention provide novel and advantageous doped (e.g., cerium-doped) glass scintillators (e.g., silicate glass scintillators) and methods of fabricating and using the same. Doped glass scintillators (e.g., cerium-doped silicate glass scintillators) can be fabricated by a stereolithography process. Doping can be carried out before the green body composite formation so that homogeneity of the dopant (e.g., cerium (Ce) dopant) is improved. The structures retain an amorphous structure through the fabrication process, and the vacuum sintering process assists with keeping the dopants (e.g., trivalent Ce dopants) in their luminescence-producing oxidation state (e.g., in the trivalent state for trivalent Ce dopants), decreasing or eliminating the need for a reducing atmosphere. Methods of the embodiments of the subject invention can be used for fabricating transparent doped (e.g., Ce-doped) glass resulting in a purely amorphous ensemble and retaining the dopant in its luminescent oxidation state (e.g., Ce in its luminescent trivalent oxidation state).

In an embodiment, a method of fabricating a glass scintillator can comprise: preparing a liquid composite comprising a matrix and a filler; performing a stereolithography process on the liquid composite to produce a green body ensemble; performing a debinding process on the green body ensemble to produce a brown body ensemble; and performing a sintering process on the brown body ensemble to give the glass scintillator. The method further can further comprise adding a dopant at at least one of the following stages: prior to preparing the liquid composite; while preparing the liquid composite; and prior to performing the sintering process and after performing the debinding process. The matrix can comprise a photocurable pre-polymer resin mix, the filler can comprise a ceramic powder, and the ceramic powder can comprise silicate materials (e.g., borosilicate). The performing of the stereolithography process can comprise: dispersing the liquid composite on a stirrer to form a monomeric sludge; degassing the sludge using a vacuum pump to produce a liquid glass composite; performing 3D printing on the liquid glass composite on a layer-by-layer basis to produce a printed ensemble of a predetermined geometry; and rinsing the printed ensemble in a solvent and post-curing the rinsed printed ensemble by exposing it to ultraviolet light to produce the green body ensemble. The performing of the debinding process can comprise subjecting the green body ensemble to gradual temperature ramps and isothermal treatments sufficient enough to eliminate the matrix without altering a 3D-printed shape of the green body ensemble, thereby producing the brown body ensemble. The performing of the sintering process can comprise thermally treating the brown body ensemble in a vacuum at a predetermined temperature for a predetermined time, the predetermined temperature being below at least one of a softening temperature and a melting temperature of the filler. The dopant can comprise cerium, europium, gadolinium, praseodymium, dysprosium, terbium, copper, or titanium. For example, the dopant can comprise cerium and can be, e.g., cerium III chloride or cerium III acetate. The adding of the dopant prior to preparing the liquid composite can comprise adding the dopant during a sol gel synthesis of the ceramic powder; the adding of the dopant while preparing the liquid composite can comprise adding the dopant into a mixture of the photocurable pre-polymer resin mix and the ceramic powder; and the adding of the dopant prior to performing the sintering process and after performing the debinding process can comprise dissolving the dopant in a solvent at a predetermined ratio to form a dopant solution and immersing the brown body ensemble in the dopant solution for varying times.

In another embodiment, a transparent glass ceramic scintillator can comprise a glass substrate doped with a dopant, and the transparent glass ceramic scintillator can be produced by a method as disclosed in the previous paragraph. Producing the transparent glass ceramic scintillator by such a method results in a transparent glass ceramic scintillator that is structurally different than related art scintillators, for example by having high spatial resolution of optical, electrical, mechanical, and other material properties of the final product as discussed herein. This is due to the stereolithography process, the debinding process, the vacuum sintering process, and the adding of the dopant at one (or more) of three possible stages.

DETAILED DESCRIPTION

Figures 1A, 1B, 1C:
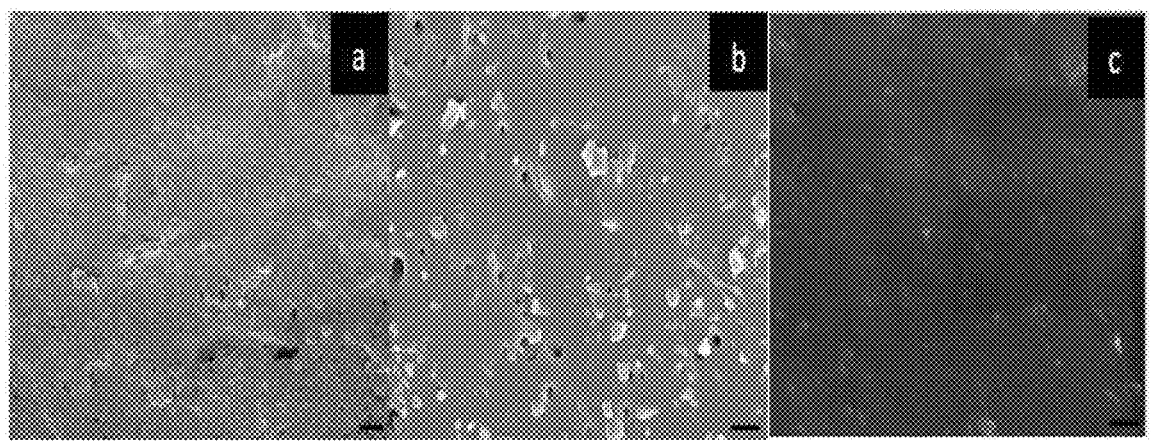
FIG. 1A is a is a scanning electron microscope (SEM) image of three-dimensional (3D) cerium-doped (Ce-doped) (in the liquid glass state) borosilicate glass after sintering at 700° C. for 10 hours; the scale bar is 20 μm.
FIG. 1B is a is a closer-up SEM image of the 3D Ce-doped (in the liquid glass state) borosilicate glass after sintering at 700° C. for 10 hours as depicted in FIG. 1A; the scale bar is 2 μm.
FIG. 1C is a is an SEM image of 3D Ce-doped (in the liquid glass state) borosilicate glass after sintering at 800° C. for 10 hours; the scale bar is 2 μm.

Embodiments of the subject invention provide novel and advantageous doped (e.g., cerium-doped) glass scintillators (e.g., silicate glass scintillators) and methods of fabricating and using the same. Doped glass scintillators (e.g., cerium-doped silicate glass scintillators) can be fabricated by a stereolithography process. Doping can be carried out before the green body composite formation so that homogeneity of the dopant (e.g., cerium (Ce) dopant) is improved. The structures retain an amorphous structure through the fabrication process, and the vacuum sintering process assists with keeping the dopants (e.g., trivalent Ce dopants) in their luminescence-producing oxidation state (e.g., in the trivalent state for trivalent Ce dopants), decreasing or eliminating the need for a reducing atmosphere. Methods of the embodiments of the subject invention can be used for fabricating transparent doped (e.g., Ce-doped) glass resulting in a purely amorphous ensemble and retaining the dopant in its luminescent oxidation state (e.g., Ce in its luminescent trivalent oxidation state).

Cerium III chloride or cerium III acetate can be introduced into borosilicate and sol gel synthesized silica particles, mixed with an acrylate-based resin, and then subjected to a photocure-debind-sinter process. Luminescence behavior can be observed showing the presence of trivalent Ce in the structure.

A scintillator is a material that exhibits luminescence when excited by ionizing radiation. Among various scintillator types, including organic and inorganic, doped glass ceramics have gained significant interest as a result of their ease of processing and good mechanical, chemical, and thermal properties, as well as their good absorbance properties at wavelengths below the visible region. Such absorbance properties are rarely exhibited in other types of commercial state of art scintillators. In addition to the ease of processing, absorbance properties, and good mechanical, chemical, and thermal properties of doped glass ceramics, glass 3D printing allows scintillators of different forms and shapes to be fabricated with even microscopic features that are non-existent in other processed glass materials. In particular, stereolithography can be used in fabricating high-quality 3D glass ensembles according to embodiments of the subject invention.

Transparent glass ceramic scintillators are doped glass ceramics that can be fabricated from ceramic powders via melt quenching or high temperature sintering. The final ensembles can include base ceramic matrices doped with a scintillating activator, such as a rare earth transition ion dopant that has at least one of its oxidation states exhibiting scintillation when exposed to radiation. The need to retain the dopant(s) in the less stable luminescence-producing oxidation state is a challenge.

Stereolithography can be used to fabricate novel glass materials via a three step photocure-debind-sinter process. First, a liquid composite can be 3D printed on a layer by layer basis into desired ensembles. The liquid composite can comprise a photocurable pre-polymer resin mix as a matrix and a ceramic powder as a filler with appropriate viscosity and optical properties. The ensembles can then be subjected to an optimizable thermal debinding process in oxygen before being sintered at appropriate rate, time, temperature, and environmental conditions. Unlike conventional melt quenching and sintering used for glass scintillator fabrication, this process allows for a flexibility for doping and co-doping such that this doping process can be carried out either in the pre-liquid glass composite stage, liquid glass composite, or after the debinding or sintering steps. In addition, when compared to the melt quenching process, this process requires no need for expensive mold fabrication from where contamination could sometimes arise. Such impurities can interfere with the absorbance and luminescence properties of the ensemble, resulting in the quenching effect common with glass scintillators.

In embodiments of the subject invention, cerium III salts can be used as a trivalent Ce dopant ($5d$ emission producing) source, and silicate materials can be used as a glass former due to their relatively low cost, ability to be applied in harsh environmental conditions. Methods of embodiments of the subject invention eliminate the need for introduction of an external reducer or reducing environment (either of which could introduce impurities) because the debinding step when properly controlled acts as a self-generated reducing environment and the low pressure vacuum sintering further helps to drive the Ce oxidation state towards its reduced trivalent state so that the final ensemble is in a state of high purity while also retaining the dopant in its luminescent oxidation state. This technique can be extended to other non-radiation sensing luminescence-requiring applications.

Stereolithography is a better substitute for conventional melt quenching as it is carried out at room temperature before being subjected to relatively low temperature thermal processing. In addition, there is no need to use chemicals for incorporation of high-resolution features. Embodiments of the subject invention provide novel 3D printing methods to fabricate functional glass materials of different forms and shapes with unique microscopic features and with properties comparable to standards. By introducing dopants at several stages of the fabrication process, the optical, electrical, mechanical, and other material properties of the final product can be tuned with high spatial resolution. For example, the mechanical properties of metallic glass alloys, dopant concentration of silicon for electronic applications, and refractive indices for glass for application in lenses and electrochromic applications can be controlled by using techniques of embodiments of the subject invention.

Embodiments of the subject invention can use a stereolithography process to fabricate transparent glass ceramic scintillators based on silicate glass networks doped with dopants (e.g., Ce dopants). A tripartite photocure-debind-sinter process can be used. First, a liquid composite comprising a photocurable pre-polymer resin mix as a matrix and a ceramic powder as a filler with appropriate viscosity and optical properties can be 3D printed on a layer-by-layer basis into desired ensembles. These ensembles can then be subjected to an optimizable thermal debinding process in air before being sintered at appropriate rate, time, temperature, and environmental conditions. Doping and codoping processes can be introduced during the fabrication and can be carried out either before or after debinding. Any suitable dopant(s) can be used, including but not limited to Ce, europium, gadolinium, praseodymium, dysprosium, terbium, copper, or titanium. Preferably the dopant(s) will exhibit variable oxidation states in such a way that a broad spectral range can be covered by the resulting doped scintillator. Silicate materials can be used as the glass former (e.g., due to their relatively low cost), but embodiments are not limited thereto; any suitable glass former can be used.

The photocuring step can be carried out via stereolithography, such as benchtop stereolithography. The pre-polymer resin and the filler can be first mixed before dispersion on a stirrer. The resulting monomeric sludge can then be degassed (e.g., using a pump such as a vacuum pump) resulting in a so-called liquid glass composite, which is then used for 3D printing. The 3D printing process can be carried out using a 3D printer (either custom made or commercially available) and design file (e.g., CAD design file) of the desired geometry. Spatial resolution depends on the capability of the printing and can easily reach down to 100 μm level. The printed ensemble is then rinsed in a solvent (e.g., ethanol) after which it can be post cured (e.g., using ultraviolet (UV) light, such as a 365 nm UV lamp) to yield a "green body" (unsintered) before being carefully moved (e.g., to a furnace) for thermal processing. The debinding step can entail subjecting the 3D printed ensembles to gradual temperature ramps and isothermal treatments sufficient enough to eliminate the polymeric matrix without altering the 3D-printed shape resulting in a "brown body". The sintering step can be carried out at sufficient temperature below the softening (and/or melting) temperature of the glass forming material (e.g., borosilicates and silica) and can be done in vacuum.

In certain embodiments, three different approaches to doping can be carried out depending on what stage of the fabrication process the dopants are introduced. For the brown body doping, the dopants can be first dissolved in a solvent (e.g., ethanol) in a predetermined ratio (e.g., a ratio of 1 mol:1 ml) and then the brown body is immersed in the solution for varying times. For the liquid glass doping, the dopants can be added into the liquid glass composite mix of resin and ceramic. For the pre-liquid glass state doping, the dopant can be added during the sol gel synthesis of the ceramic powder. In all doping, the dopant concentrations can be kept low (e.g., below 5 mol % concentration).

Embodiments of the subject invention eliminate the need for introduction of reducing materials or a reducing environment as the debinding step when properly controlled acts as a self-generating reducing environment. The vacuum sintering step further helps to reduce any additional oxidized dopant so that the final ensemble is in a state of high purity while also retaining the dopant in its luminescent oxidation state. Embodiments of the subject invention can also lead to scale ups, microscopic features, and miniaturization without having to account for the reactivity of the dopants with the chemical reagents conventionally used to create microscopic features on glass ensembles. These techniques and processes can also be extended to other non-radiation detection luminescence requiring applications.

Embodiments of the subject invention provide manufacturing methods for fabricating custom-designed functional glass materials including but not limited to glass-based scintillators. The methods of embodiments of the subject invention can be used for fabricating various types of doped glass with different dimensions and structures (e.g., sheets, fibers, complex structures) for different optical applications, including but not limited to lenses, filters, detectors, and microfluidic channels with embedded/integrated electronic, optical, and mechanical components for advanced capabilities.

Embodiments of the subject invention allow fabrication of glass and ceramic structures with custom-designed geometries, as well as allowing fabrication at-site and on-demand while being scalable for large volume manufacturing. Embodiments of the subject invention provide relatively simple, low-cost, low-labor, low energy, and environmentally benign processes; such processes are low-temperature processes compared to typical melt quenching processes, and they do not require the typical finishing processes associated with melt quenched samples (grinding and polishing). Such processes are free of contamination that may otherwise result from molds and crucibles used in conventional manufacturing techniques. Embodiments of the subject invention allow for precise control of optical, electrical, mechanical, and other material properties with high special resolution by introducing a large variety of doping materials. There is great flexibility for doping and co-doping at several stages of the fabrication process depending on the specific property of interest. This capability allows fast, on-site manufacturing of various components and integrated systems including but not limited to eyeglass lenses, advanced filters and light detectors, lab-on-chip systems, and wearable sensor platforms.

A greater understanding of the embodiments of the subject invention and of their many advantages may be had from the following examples, given by way of illustration. The following examples are illustrative of some of the methods, applications, embodiments, and variants of the present invention. They are, of course, not to be considered as limiting the invention. Numerous changes and modifications can be made with respect to the invention.

Example 1

Materials

Acrylate based resins were selected because of their compatibility with stereolithography. They exhibit minimal moisture inhibition during processing and have a fast curing rate compared to other resins such as epoxies. For the synthesized silica, tetraethyl orthosilicate (TEOS) (Si ($OC_2H_5$)$_4$) (Milllipore Aldrich Inc) was used as a precursor, and borosilicate particles (20 μm) were supplied by Corning Inc. For doping and applications, cerium III chloride ($CeCl_3$) (Fischer Scientific Inc), cerium III acetate (Fischer Scientific Inc) and magnesium acrylate salts (Alfer Aesar Inc) were used as purchased. Hydrochloric acid, acetone, and ethanol solvents were purchased from Milllipore Aldrich, Alfa Aesar, and Millipore Aldrich, respectively.

3D Printing

The matrix and filler components of the liquid glass composite were mixed and then dispersed with a stirrir to allow for complete homogenization. The resulting sludge was then degassed using a lab made rotary vacuum pump and then used for 3D Printing. For benchtop stereolithography and gel casting ensembles, the monomeric mixture always consisted of a 30-50 vol % solid filler loading. The 3D printing process was carried out using a Formlabs 1+($\lambda$=405 nm) with an XY resolution of 300 μm based on already made CAD-designs on a Solid Works 2015 software. The lateral and Z-resolution were respectively set to 0.2 mm for all printed ensembles (green body). The obtained green body was then rinsed in ethanol and then post cured using a 365 nm UV lamp XX series before being carefully moved to a furnace for thermal processing.

Sol Gel Synthesis

The sol gel synthesis method of Li et al. (Nanoporous tree-like SiO2 films fabricated by sol-gel assisted electrostatic spray deposition, *Micropor Mesopor Mat*, 2012, 151, 488-494; which is hereby incorporated by reference herein in its entirety) was used. A sol-gel method was utilized to prepare the precursor solution: tetraethyl orthosilicate (TEOS), ethanol (EtOH), hydrochloric acid, and $H_2O$ were mixed in a molar ratio of TEOS:EtOH:$H_2O$:HCl=1:10:4:0.05. The solution was then stirred at 40° C. for 5 hours (h) in a reflux condenser and then aged for 24 h. For benchtop stereolithography application, the obtained sol was then subjected to vacuum drying and the then the xerogel obtained was crushed under acetone to yield silica particles, which were then used for the fabrication of the liquid glass. For thin film applications, the obtained sol was mixed with butyl carbitol in a 1:4 ratio and then deposited using an electrospray deposition process (flow rate=1.8 milliliters per hour (ml/h); DC power=4 kilovolts (kV); substrate temperature 240-270° C.) after which the sample was annealed at 600° C. for an hour in argon atmosphere.

Doping

Three different types of doping were carried out. For the brown body doping, the dopants were first dissolved in ethanol 1 mol:1 ml and then the brown body was immersed in the solution for varying times. For the liquid glass doping, the dopants were added into the liquid glass composite mix of resin and ceramic whereas for the pre-liquid glass state, the dopant was added during the sol gel synthesis of the ceramic powder.

Microstructural Characterization

Scanning Electron Microscopy (SEM)—A JEOL JSM-6330F field emission SEM-EDS (Tokyo, Japan) was employed to investigate the surface, porosity, and morphology of the resulting ensemble at various steps of the fabrication process. Energy Dispersive X-ray Spectroscopy (EDS) was used to ascertain the elemental composition of the resulting ensembles after every stage of interest during the fabrication process. The degree of oxidation, concentration of impurity, and consistency of dopant concentration during processing was investigated by this technique.

Fourier-transform infrared (FTIR) spectroscopy—Vibration band assignments from FTIR analysis would unveil the presence of residual or complete degradation of the crosslinked polymer after any debinding process. A JASCO FT-IR 4100 spectrometer was used.

X-ray diffraction (XRD)—The presence and degree of crystallinity of fabricated ensembles were ascertained by XRD technique. Scan speed was 0.1 degree/min and step size was 0.02. Voltage was set to 40 kV, and the system used a copper X-ray source at 1.542 A.

Thermal Analysis

An SDT Q600 was used for the differential scanning calorimetry (DSC) analysis and thermogravimetric analysis (TGA). DSC was used to determine the melting, softening, and crystallization behavior of the borosilicate, silica, and resin used both as individual ensemble and when in combination with themselves or dopants. TGA was used to investigate the degradation behavior of the polymer resin component of the green body, both as a stand-alone ensemble and when in composite form.

Optical Characterization

The light transmittance and absorption at different wavelengths of the final ensemble were investigated using an optical spectrophotometer. The luminescence properties were investigated using a photoluminescence spectrometer.

Results

Figure 6:
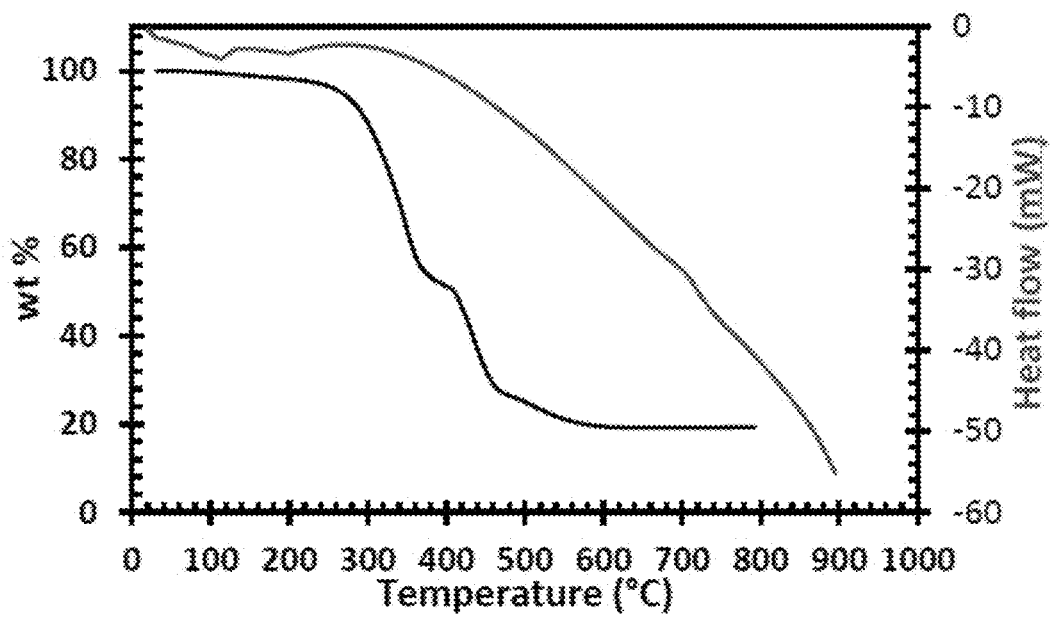
FIG. 6 shows differential scanning calorimetry analysis (DSC) (for borosilicate glass) and thermogravimetric analysis (TGA) analysis (for undoped borosilicate-resin green body) curves during temperature ramping at a rate of 10° C./min.
Figure 7:
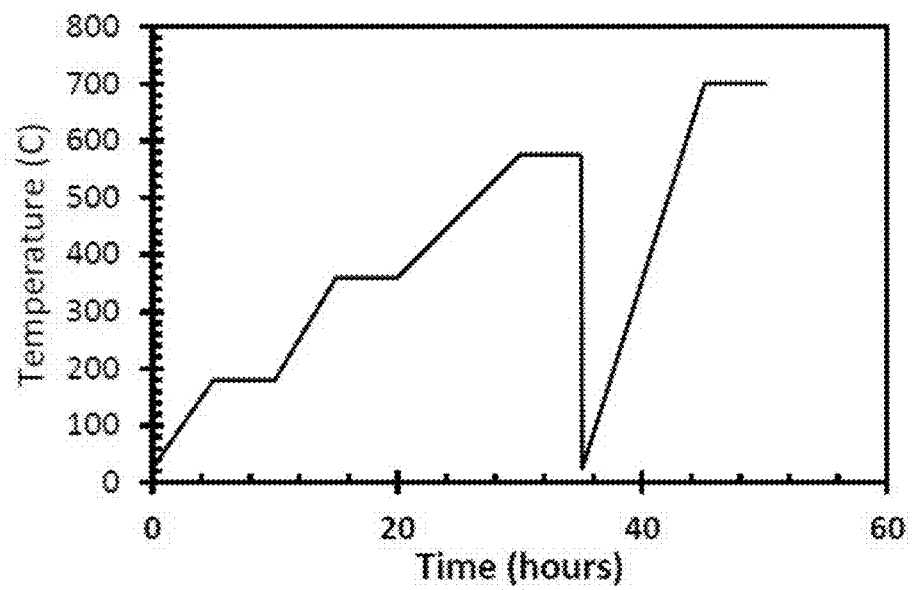
FIG. 7 shows a plot of temperature (in ° C.) versus time (in hours), showing thermal protocol for debinding and sintering of a borosilicate ensemble.
Figure 8:
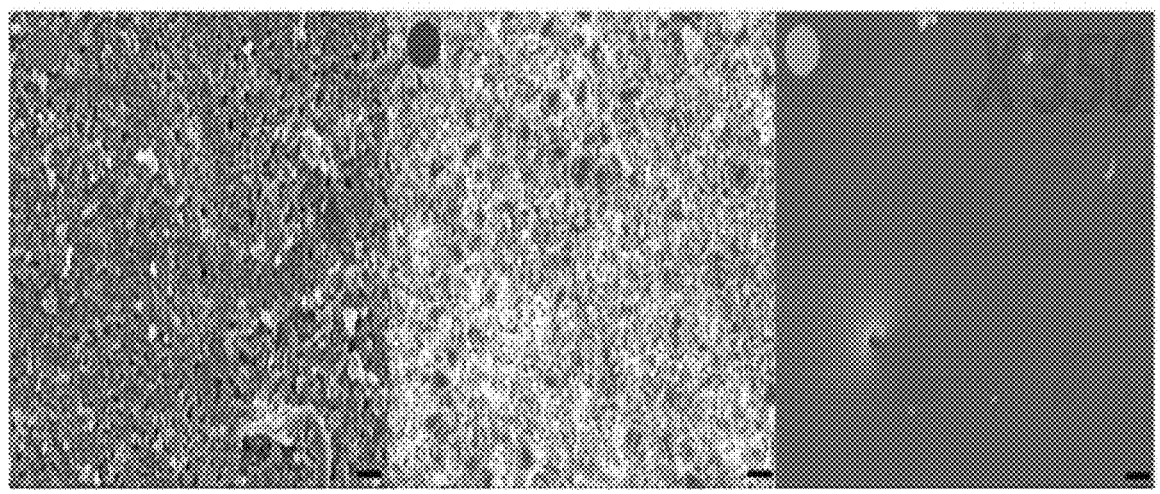
FIG. 8 shows evolution of the microstructure of undoped borosilicate glass ensemble during thermal processing, with the leftmost image showing green body, the center image showing brown body, and the rightmost image showing sintered body. The scale bar for all three images is 20 μm.

The green body composites (green body) were first subjected to TGA. FIG. 6 (left-most curve) shows the degradation trend of the composite. Initially, there was a very slow process where weight was fairly constant up to 270° C., implying total curing (absence of monomers or oligomers) of the composite. Beyond this temperature there were three main faster stages of degradation. To optimize the debinding process, sufficient times can be given at these temperatures to avoid pulverization of the 3D structures. FIG. 7 shows the thermal protocol to be used for the entire thermal process, which is a combination of the debinding and sintering process. The sintering temperature was optimized based on the crystallization temperature and softening temperature as the case may be. For borosilicate particles this is 711° C. whereas for silica, the theoretical softening temperature is about 1700° C.

Liquid Glass Ce-Doping of 3D Borosilicate Glass

Figure 1D:
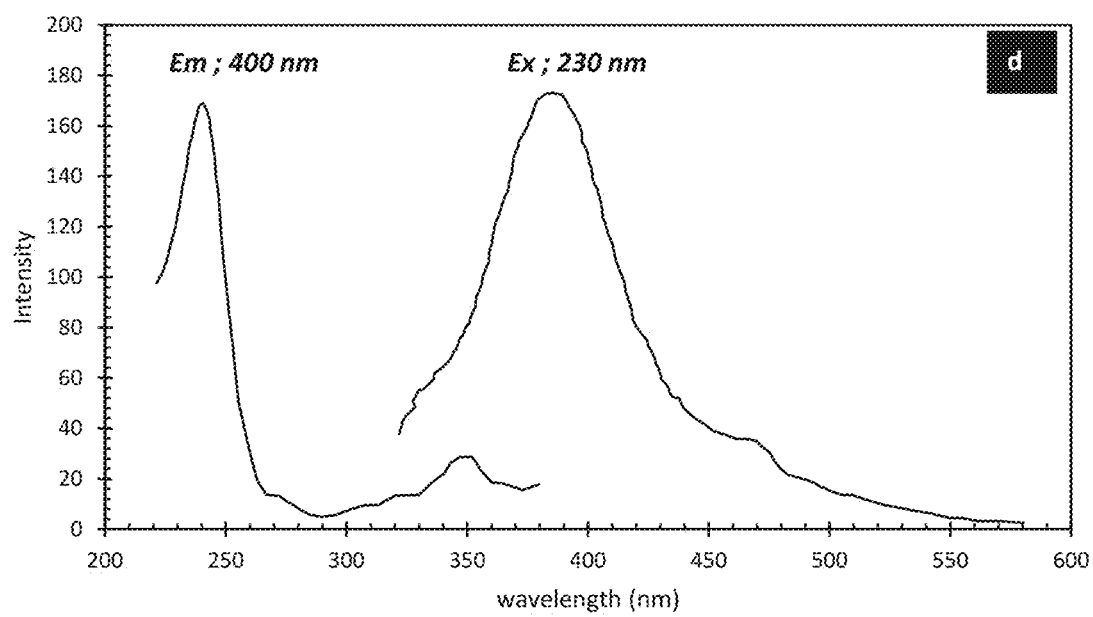
FIG. 1D is a photoluminescence spectrum for a Ce-doped borosilicate glass ensemble sintered at 700° C. for 10 hours. The excitation spectrum is for a 400 nm emission while the emission spectrum is for a 230 nm excitation.
Figure 9:
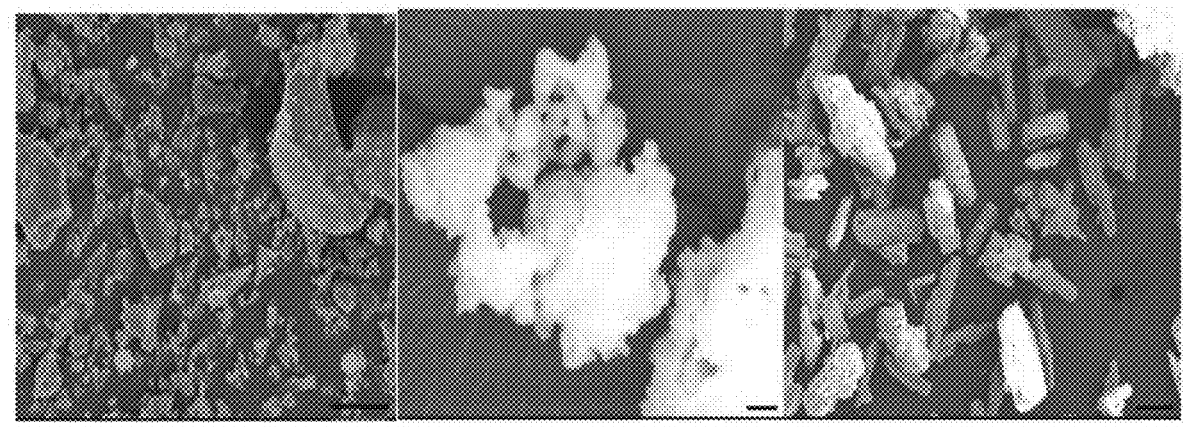
FIG. 9 shows SEM images of borosilicate glass powder (leftmost image, scale bar is 20 μm) with cerium salts used for the doping process, cerium chloride (center image, scale bar is 2 μm), and cerium acetate (rightmost image, scale bar is 100 μm).

FIGS. 1A and 1B shows SEM micrographs of the sintered (700° C.) Ce-doped ensemble when cerium acetate (see also FIG. 9) was introduced into the liquid resin before forming the green body. There is a uniform homogeneous Ce distribution in the resulting borosilicate matrix. However, a high degree of porosity and roughness was observed. This roughness decreased at a higher temperature of 800° C. (FIG. 1C), though the softening observed at this temperature resulted in a distortion of the 3D shape. FIG. 1D shows the photoluminescence spectrum obtained for a fixed excitation wavelength of 300 nanometers (nm). A broad spectrum with three characteristic peaks was observed.

Brown Body Ce-Doping of 3D Borosilicate Glass

Figure 2A:
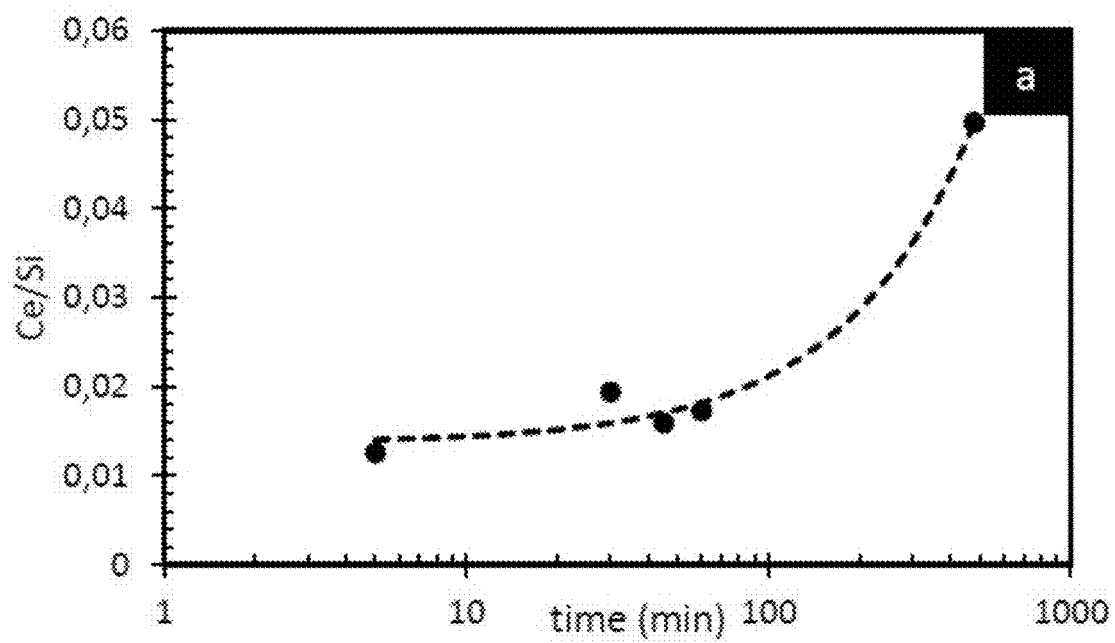
FIG. 2A is a plot of cerium to silicon ratio (Ce/Si) versus time (in minutes (min)), showing the time dependence of Ce concentration in a 3D brown body structure.
Figure 2B:
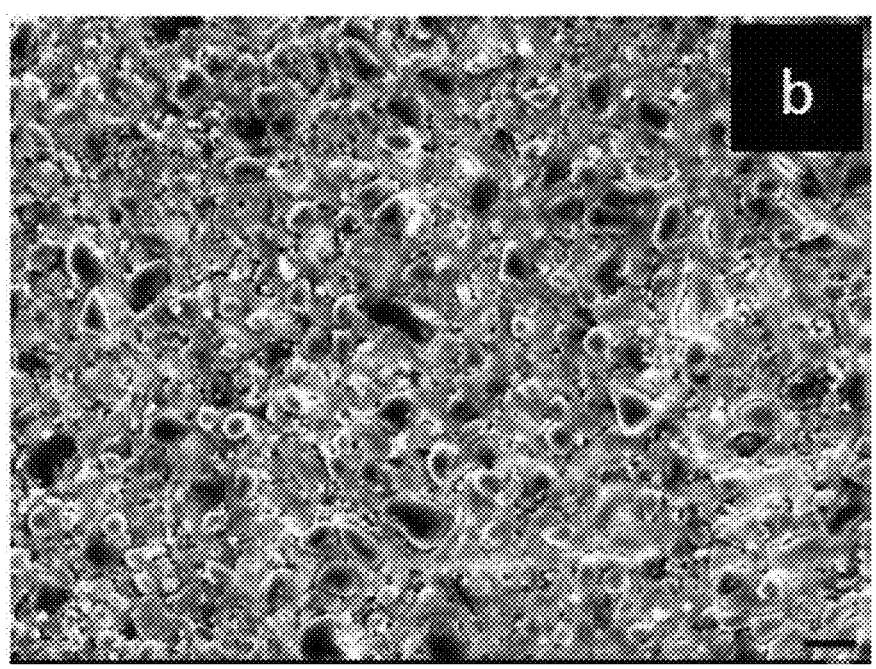
FIG. 2B is an SEM image of 3D Ce-doped (in the brown body state) borosilicate glass after sintering at 700° C. with $CeCl_3$ as the dopant; the scale bar is 20 μm.

FIG. 2A shows the relative concentration of Ce to silicon (Si) when immersed in a 1 mol $CeCl_3$:1 ml EtOH solution as a function of immersion time. This was obtained based on the atom percent data obtained from EDX analysis of the 3D structures after sintering. The doping process is diffusion driven, and there is a sigmoidal time dependence so that the cerium concentration in the final ensemble can be approximately determined and controlled. An immersion time of 90 minutes was used to minimize the quenching effect associated with high Ce dopant concentration in glass scintillators. After the immersion process, vacuum sintering was performed for 1 hour before the sintering process was carried out. FIG. 2B shows the SEM micrograph of the resulting ensemble after sintering.

Pre-Liquid Glass Doping of Sol Gel Synthesized Silica

Figure 3:
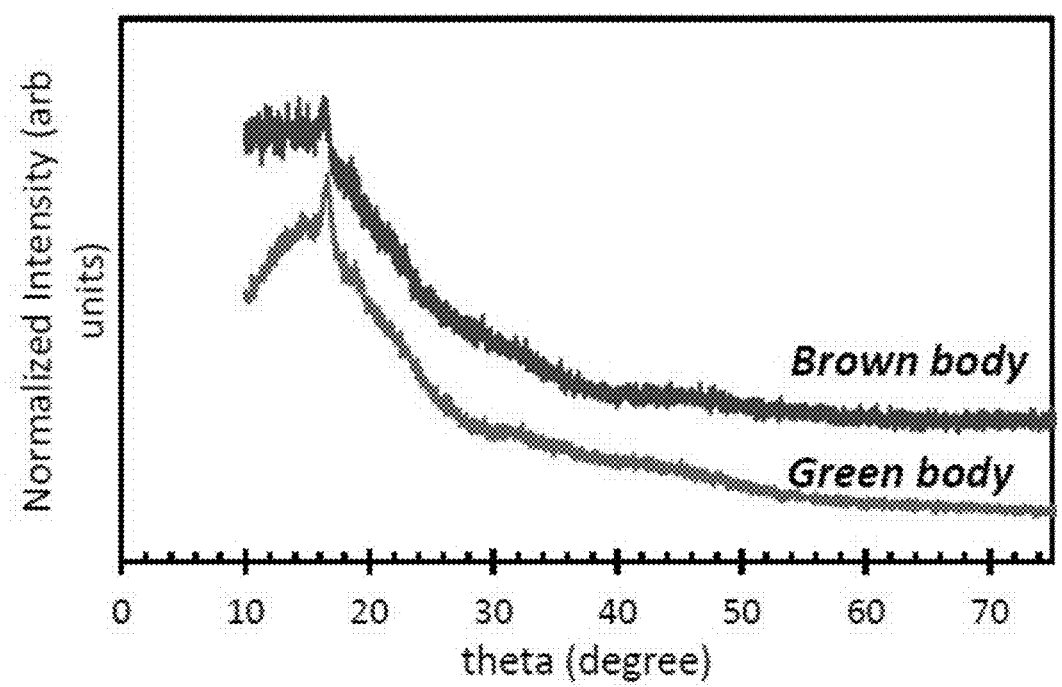
FIG. 3 is an X-ray diffractogram for 3 wt % Ce-doped $SiO_2$ synthesized via sol gel synthesis before and after debinding at 575° C.
Figure 4:
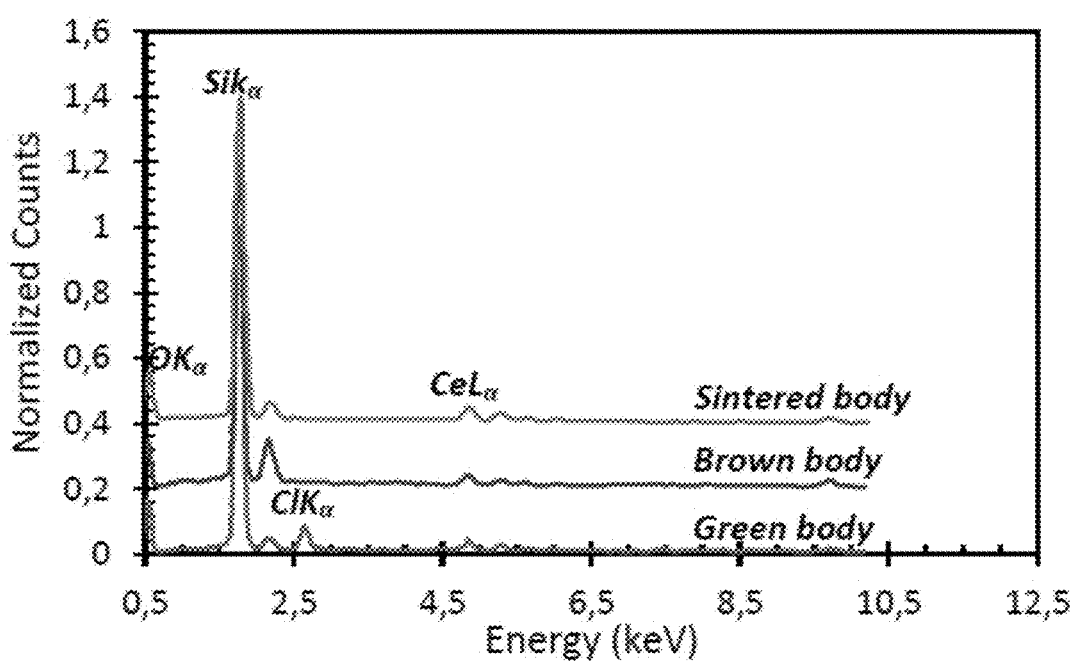
FIG. 4 shows energy dispersive X-ray (EDX) spectra after a cure:debind:sinter process of Ce-doped $SiO_2$.
Figure 5:
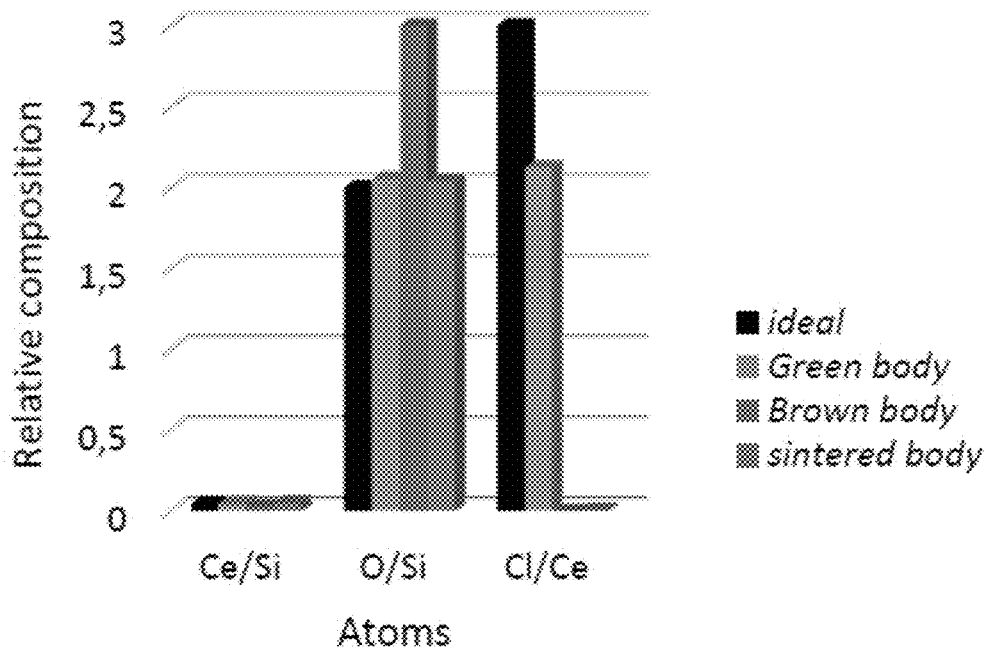
FIG. 5 shows relative compositions of atoms in C-doped $SiO_2$ after photocuring, debinding, and sintering. In each grouping (ratio of Ce/Si, ratio of O/Si, and ratio of Cl/Ce), the leftmost bar is for ideal, the second-from-the-left bar is for green body, the second-from-the-right bar is for brown body, and the rightmost bar is for sintered body.
Figure 10:
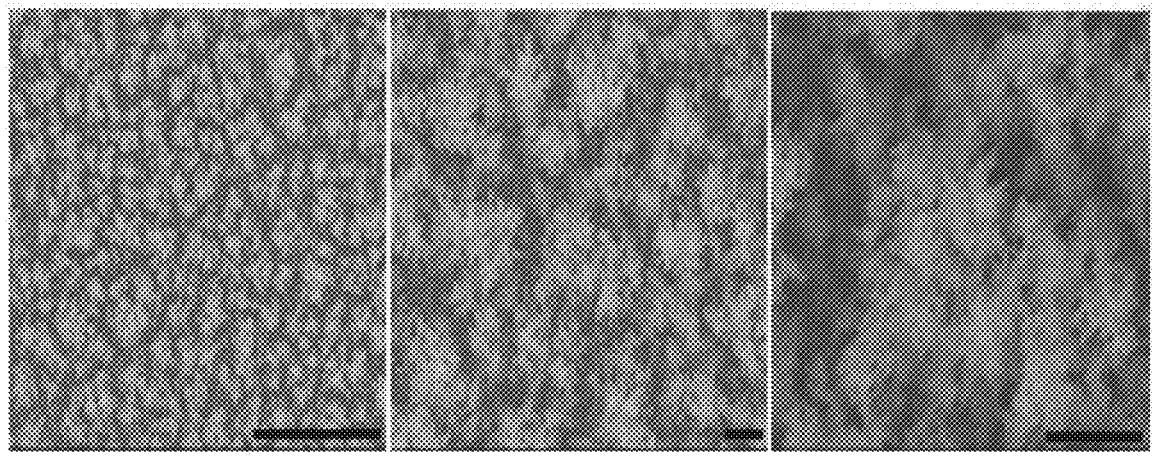
FIG. 10 shows SEM micrographs of sol gel Ce-doped nano-silica particles with increasing magnification. The leftmost image has a scaled bar of 20 μm; the center image (brown body) has a scale bar of 2 μm; and the rightmost image (sintered body) has a larger scale bar that is also 2 μm.

FIG. 10 shows the SEM of the synthesized sol particles deposited by electrostatic spray deposition on silicon wafers. The X-ray diffractogram of the 3D Ce-doped silica glasses are shown in the leftmost image of FIG. 3, before (lower curve) and after (upper curve) sintering; a 3 mol % of Ce was used. A broadband halo without any specific diffraction peaks indicates a retention of a totally amorphous nature totally and an absence of precipitation of crystalline phases after both processes. Energy dispersive X-ray spectroscopy spectra in FIG. 4 confirm the presence of silicon, chlorine, cerium, and oxygen in the 3D ensemble as observed from the 1.739(K$\alpha$), 2.621(K$\alpha$), 4.839(L$\alpha$), and 0.525(K$\alpha$) peaks, respectively. The atom and weight composition data obtained after EDS analysis of ensembles after the three processes are shown in Table 1. An estimate of the Ce/Si, Cl/Ce, and O/Si ratios based on the atomic composition obtained from the table can be extracted and is shown in FIG. 5. The amount of Ce relative to Si (Ce/Si) is fairly conserved all through the process. FIG. 5 further shows that there is about a 50% increase in the oxygen content after debinding. However, the low pressure vacuum sintering process eliminates this absorbed oxygen so that the oxygen level is restored after sintering. In addition, it is observed from the Cl/Ce ratio that the initial 3:1 atom ratio eventually becomes zero, implying that there is a complete elimination of chlorine from the ensemble.

TABLE 1

Atomic and Relative Composition during fabrication of Ce doped SiO2 via stereolithography

|  |  | O | Si | Cl | Ce | Ce/Si | Cl/Ce | O/Si | Total |
|---|---|---|---|---|---|---|---|---|---|
|  | Peak | 0.525 (K$\alpha$) | 1.739 (K$\alpha$) | 2.621 (K$\alpha$) | 4.839 (L$\alpha$) |  |  |  |  |
|  | Atom % | 68.952 | 26.849 | 2.799 | 1.399 |  |  |  | 100 |
| Before debinding | Relative atom ratio |  |  |  |  | 0.052 | 2.000 | 2.568 |  |
|  | Atom % | 74.154 | 24.915 | 0.000 | 0.931 |  |  |  | 100 |
| After debining | Relative atom ratio |  |  |  |  | 0.037 | 0.000 | 2.976 |  |
|  | Atom % | 65.940 | 32.610 | 0.030 | 1.420 |  |  |  | 100 |
| After sintering | Relative atom ratio |  |  |  |  | 0.044 | 0.021 | 2.022 |  |

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein are incorporated by reference in their entirety, including all figures and tables, to the extent they are not inconsistent with the explicit teachings of this specification.

What is claimed is:

1. A method of fabricating a glass scintillator, the method comprising:
    preparing a filler comprising a ceramic powder, the filler being prepared by a sol gel synthesis that includes adding a dopant to the ceramic powder as it is being synthesized;
    after preparing the filler, preparing a liquid composite comprising a matrix and the filler, the matrix comprising a photocurable pre-polymer resin mix, and the preparing of the liquid composite comprising adding the dopant into a mixture of the photocurable pre-polymer resin mix and the ceramic powder;
    after preparing the liquid composite, performing a stereolithography process on the liquid composite to produce a green body ensemble;
    after performing the stereolithography process, performing a debinding process on the green body ensemble to produce a brown body ensemble that is free of chlorine;
    dissolving the dopant in a solvent at a predetermined ratio to form a dopant solution;
    after performing the debinding process, immersing the brown body ensemble in the dopant solution for varying times; and
    after immersing the brown body ensemble in the dopant solution, performing a sintering process on the brown body ensemble to give the glass scintillator.

2. The method according to claim 1, the ceramic powder comprising silicate materials.

3. The method according to claim 2, the ceramic powder comprising borosilicate.

4. The method according to claim 1, the performing of the stereolithography process comprising:
    dispersing the liquid composite on a stirrer to form a monomeric sludge;
    degassing the sludge using a vacuum pump to produce a liquid glass composite;
    performing 3D printing on the liquid glass composite on a layer-by-layer basis to produce a printed ensemble of a predetermined geometry; and
    rinsing the printed ensemble in a solvent and post-curing the rinsed printed ensemble by exposing it to ultraviolet light to produce the green body ensemble.

5. The method according to claim 1, the performing of the debinding process comprising subjecting the green body ensemble to gradual temperature ramps and isothermal treatments sufficient enough to eliminate the matrix without altering a 3D-printed shape of the green body ensemble, thereby producing the brown body ensemble.

6. The method according to claim 1, the performing of the sintering process comprising thermally treating the brown body ensemble in a vacuum at a predetermined temperature for a predetermined time, the predetermined temperature being below at least one of a softening temperature and a melting temperature of the filler.

7. The method according to claim 1, the dopant comprising cerium, europium, gadolinium, praseodymium, dysprosium, terbium, copper, or titanium.

8. The method according to claim 1, the dopant comprising cerium.

9. The method according to claim 8, the dopant being cerium III chloride or cerium III acetate.

10. A method of fabricating a glass scintillator, the method comprising:
preparing a filler comprising a ceramic powder, the filler being prepared by a sol gel synthesis that includes adding a dopant to the ceramic powder as it is being synthesized;
after preparing the filler, preparing a liquid composite comprising a polymeric matrix and the filler, the matrix being a photocurable pre-polymer resin mix, and the preparing of the liquid composite comprising adding the dopant into a mixture of the photocurable pre-polymer resin mix and the ceramic powder;
after preparing the liquid composite, performing a stereolithography process on the liquid composite to produce a green body ensemble;
after performing the stereolithography process, performing a debinding process on the green body ensemble to produce a brown body ensemble that is free of chlorine;
dissolving the dopant in a solvent at a predetermined ratio to form a dopant solution;
after performing the debinding process, immersing the brown body ensemble in the dopant solution for varying times; and
after immersing the brown body ensemble in the dopant solution, performing a sintering process on the brown body ensemble to give the glass scintillator,
the ceramic powder comprising silicate materials,
the performing of the stereolithography process comprising:
dispersing the liquid composite on a stirrer to form a monomeric sludge;
degassing the sludge using a vacuum pump to produce a liquid glass composite;
performing 3D printing on the liquid glass composite on a layer-by-layer basis to produce a printed ensemble of a predetermined geometry; and
rinsing the printed ensemble in a solvent and post-curing the rinsed printed ensemble by exposing it to ultraviolet light to produce the green body ensemble,
the performing of the debinding process comprising subjecting the green body ensemble to gradual temperature ramps and isothermal treatments sufficient enough to eliminate the polymeric matrix without altering a 3D-printed shape of the green body ensemble, thereby producing the brown body ensemble,
the performing of the sintering process comprising thermally treating the brown body ensemble in a vacuum at a predetermined temperature for a predetermined time, the predetermined temperature being below at least one of a softening temperature and a melting temperature of the ceramic powder, and
the dopant being cerium III chloride or cerium III acetate.

11. The method according to claim 10, the adding of the dopant to the ceramic powder as it is being synthesized comprising adding the dopant at a first concentration of below 5 mol %,
the adding of the dopant into the mixture of the photocurable pre-polymer resin mix and the ceramic powder comprising adding the dopant at a second concentration of below 5 mol %, and
the predetermined ratio at which the dopant is dissolved in the solvent to form the dopant solution being below 5 mol %.

12. The method according to claim 1, the adding of the dopant to the ceramic powder as it is being synthesized comprising adding the dopant at a first concentration of below 5 mol %,
the adding of the dopant into the mixture of the photocurable pre-polymer resin mix and the ceramic powder comprising adding the dopant at a second concentration of below 5 mol %, and
the predetermined ratio at which the dopant is dissolved in the solvent to form the dopant solution being below 5 mol %.

\* \* \* \* \*